2,875,081
METHOD FOR PREPARING ADHESIVE COATING COMPOSITIONS AND GELS THEREFOR

George D. Duro, Willowick, Ohio, assignor to The Harshaw Chemical Company, Cleveland, Ohio, a corporation of Ohio No Drawing. Application August 9, 1957
Serial No. 677,202

9 Claims. (Cl. 106—268)

This invention relates to an improvement in methods for preparing adhesive compositions from aluminum soaps and waxes and more particularly to an improved method for preparing gels for adhesive compositions composed of aluminum soaps and waxes. This application is a continuation-in-part of my copending applications bearing Serial Nos. 651,808 and 658,219 filed April 10, 1957, and May 10, 1957, respectively, both now abandoned.

In the preparation of adhesives from waxes and aluminum soaps, the wax and soap are usually first intimately mixed by dispersing the soap in the wax at temperatures above the melting point of the wax and below the gelation temperature. Such dispersions are not readily accomplished and require the use of expensive mixing equipment since the soaps are not truly soluble in the wax but rather only dispersible therein. Furthermore, the dispersions must be effected under rather close temperature conditions since it is undesirable for gelation to take place prior to the obtainment of a homogeneous dispersion of the soap in the wax.

One such prior art method for preparing adhesive compositions from waxes and aluminum soaps is exemplified by the method set forth in United States Patent No. 2,348,688. According to the method of this patent, a microcrystalline wax and aluminum distearate are intimately mixed by first melting the wax and then slowly adding powdered aluminum distearate to the wax at about 180° F. The process of mixing takes from about one-half to about one hour and is productive of a low viscosity milky mixture. After uniformly dispersing the aluminum distearate in the molten wax the temperature of the mixture is raised to cause gelation.

In practice there are several methods for conditioning the gel formed to give it the desired properties for use as an adhesive, these properties usually depending upon the method of applying the adhesive to base materials such as labels, etc. For example, it is desirable when the gel is to be employed with roll coating apparatus to obtain a gel having properties closely associated with the Newtonian condition. When gelation first occurs, the viscosity is not too great, but as the gel is maintained in an agitated condition at gelation temperatures, the viscosity increases considerably to the point where a viscous elastic gel is produced. The viscous elastic gel is characterized by having a viscosity usually between about 75,000 and 150,000 cps. and by exhibiting thixotropic properties. This viscous elastic gel may be conditioned to obtain a less viscous and less elastic gel by long and continued heating under elevated temperature conditions (e. g. 250° F. to 260° F.) to obtain a suitable adhesive composition having a viscosity of preferably from about 20,000 to about 55,000 cps. Another method of conditioning the viscous elastic gel to minimize its thixotropic properties and to approach the Newtonian condition is to partially peptize the gel by mixing in ester gums (glycerol esters of rosin), unmodified phenol-formaldehyde resins or other hydrocarbon soluble peptizing agents such as hydrogenated rosins and zinc naphthenate. This can be done after the viscous elastic is gel produced although preferably the peptizing agent is added shortly after gelation first occurs. Other conditioning methods, of course, may be employed, all of which are evident to those skilled in the art.

According to the invention it has been found that a gel of microcrystalline wax and aluminum soap may be produced readily by producing the aluminum soap in situ through a reaction involving an aluminum trialcoholate derived from an alcohol having from 2 to 5 carbon atoms, a saturated higher fatty acid composed predominantly of one or more acids of natural origin having from 14 to 22 carbon atoms and water providing certain conditions are adhered to during the preparation of the aluminum soap. This method has among others, the advantage of using cheaper raw materials in its preferred form and is productive of a better gel since commercial forms of aluminum soaps such as aluminum stearates usually have some water soluble salts associated therewith which act as peptizing agents requiring the use of greater amounts of soap for equivalent results. Furthermore, it is known that commercial forms of aluminum stearates contain excess acid which is detrimental in many respects since the excess acid acts to produce an inferior gel.

Accordingly, it is an object of the invention to provide an improvement in processes for producing adhesive compositions.

Another object is to provide a method for producing a gel containing waxes and aluminum soaps.

Other objects will be apparent from the following description and disclosure.

Briefly, the soap is formed in the microcrystalline wax by first mixing an aluminum trialcoholate and a saturated higher fatty acid therein under conditions which produce a fatty acid modified aluminum alcoholate. The proportions of the acid and trialcoholate employed are such that only a portion of the combined alcohol is released from the aluminum trialcoholate during the reaction, and the temperatures employed are such that a frothy mixture of wax and fatty acid modified aluminum alcoholate is produced which has vaporized alcohol dispersed throughout. The actual gelation is accomplished through the addition of water to the frothy mixture to hydrolyze the fatty acid modified alcoholate and to release the balance of the alcohol combined therewith. The frothy mixture containing dispersed vaporized alcohol to which the water is added must be maintained during and after the water addition under conditions such that the water is maintained in a vaporized state therein until it reacts with the fatty acid modified aluminum alcoholate. Thus, if ice or water is added, the heat content of the frothy mixture must be such as to form steam therefrom. On the other hand, if steam is added, the temperature of the frothy mixture may be lower. By adding the water or its equivalents, ice or steam, to the frothy mixture under conditions wherein the water is transformed to, and maintained in, a vaporized state, a uniform gel is produced and the fatty acid modified aluminum alcoholate is effectively hydrolyzed. If these vaporizing conditions are not maintained, it has been found practically impossible to get the water to react with the fatty acid modified alcoholate. Apparently, the vaporized alcohol in the frothy mixture becomes associated with the vaporized water and aids in dispersing the water throughout the mixture. Usually, the conditions under which the water is added are such that gelation occurs rapidly, depending, of course, upon the amount of agitation employed. The greater the agitation, the faster the gel is formed. After the gel has been formed, it may be conditioned according to methods well known in the art.

The invention will most particularly be described hereinafter with respect to the use of aluminum tri-isopropylate, stearic acid and microcrystalline wax. It will be apparent, however, that other waxes such as paraffins, beeswax, montan, and hydrogenated tallow as well as other animal, vegetable and mineral waxes may be employed for modifying the basic properties of the microcrystalline waxes. Similarly, other aluminum trialcoholates may be employed which are derived from alcohols having from 2 to 5 carbon atoms. Mixed trialcoholates such as aluminum di-isopropylate monobutylate may also be employed and, accordingly, the term "trialcoholate" is to be understood as encompassing such mixed alcoholates. The form of "saturated higher fatty acid" employed in the process of the invention must be composed predominantly of one or more saturated acids of natural origin having from 14 to 22 carbon atoms such as myristic, palmitic, stearic, arachidic and behenic acids. Such acids have an even number of carbon atoms and are obtainable commercially as commercially pure acids or as mixtures of such acids and many contain small quantities of fatty acids not having from 14 to 22 carbon atoms such as lauric acid or of fatty acids which are unsaturated such as oleic acid. Accordingly, the phrase "saturated higher fatty acid" has reference herein to any form of saturated fatty acid so long as the form of fatty acid is composed predominantly of at least one saturated fatty acid of natural origin having from 14 to 22 carbon atoms. Otherwise stated the phase "saturated higher fatty acid" has reference to any form of fatty acid which is composed predominantly of fatty acids selected from the group consisting of myristic acid, palmitic acid, stearic acid, arachidic acid, behenic acid and mixtures thereof. Since the strongest gels are obtainable from a saturated higher fatty acid containing predominantly myristic and/or palmitic and/or stearic acids, such acids are preferred.

In the first step of the process for preparing an adhesive composition employing the method of preparing the gel according to the invention, a fatty acid modified aluminum isopropylate is formed. For example, microcrystalline wax, stearic acid and aluminum tri-isopropylate are first mixed under substantially anhydrous conditions at a temperature from in excess of the boiling point of isopropyl alcohol to about 300° F. Preferably, the temperature employed ranges from about 200° F. to about 250° F. Temperatures in excess of about 300° F. should not be employed since there is a tendency to form esters at the higher temperatures. A temperature in excess of the boiling point of the alcohol combined with the trialcoholate should be employed in order for the reaction to proceed and in order to form a frothy mixture containing dispersed alcohol vapors. The wax, fatty acid and trialcoholate should be thoroughly mixed so that a uniform frothy mixture of fatty acid modified aluminum alcoholate and wax containing dispersed alcohol vapors is produced.

The best adhesive compositions are produced when the amount of aluminum trialcoholate employed to form the gel ranges from about 1% to about 15% of aluminum trialcoholate by weight of the microcrystalline wax. With respect to the quantity of saturated higher fatty acid mixed with the wax and aluminum trialcoholate, 1.2 to 2.4 mols of the acid per mol of aluminum trialcoholate may be found suitable but the acid is preferably employed in amounts ranging form about 1.8 to about 2.2 mols of the acid per mol of aluminum trialcoholate. It will be apparent, for example, when 2 mols of stearic acid are employed per mole of aluminum tri-isopropylate that an aluminum distearate monoisopropylate is formed with the evolution of 2 mols of isopropyl alcohol. To form the gel, it is necessary to hydrolyze the aluminum distearate monoisopropylate, in the case of the example, to free the 1 mol of alcohol forming the balance of the alcohol combined with the stearic acid modified aluminum isopropylate.

When utilizing a form of saturated higher fatty acid which is a mixture of acids, as for example, when utilizing certain commercial forms of saturated higher fatty acids which, although containing predominant amounts of $C_{14}$–$C_{22}$ saturated fatty acids, nevertheless contains other acids such as oleic or lauric acids, the number of mols of acid in the particular form of acid is determined by utilizing the apparent molecular weight. For example, commercially pure stearic acid, as sold by Armour and Company, contains about 93% stearic acid, 5% palmitic acid and 2% oleic acid and the acid value usually runs from about 197 to 200. It is recognized that the acid value is an expression of the number of milligrams of potassium hydroxide required to neutralize the free carboxyl groups present in a one gram sample of the acid and, consequently, the apparent molecular weight of the acid employed is 56,104 divided by the acid value. Thus, the amount of saturated higher fatty acid employed in the process of the invention is calculated on the basis of the entire acid content of the particular form of acid employed.

In effecting the hydrolysis of the fatty acid modified aluminum alcoholate, the frothy mixture must be maintained under conditions such that the temperature is in excess of the boiling point of water (212° F.) to insure that the water is maintained therein in the vaporous state until it reacts to hydrolyze the fatty acid modified aluminum alcoholate. As previously mentioned the vaporized state of the water apparently is necessary to obtain adequate dispersion of the water throughout the mixture since the dispersed alcohol vapors in the frothy mixture appear to aid in dispersing the water throughout the frothy mixture so long as the water is in the vaporous state. In most cases, it is adequate to add the water for hydrolysis purposes at temperatures ranging from about 215° F. to about 265° F., and, in general, it is preferable to maintain the frothy mixture within this range during the addition to avoid excessive foaming. However, when the frothy mixture is agitated more vigorously higher temperatures may be maintained as, for example, as high as 290° F. The water may be added as such or as the solid (ice) phase thereof so long as the temperature of the frothy mixture is maintained above the boiling point of water so that the liquid or solid phases are rapidly transformed to the gaseous state (steam). Obviously, the addition may be made in the form of steam.

In making the addition of water to the frothy mixture, it has been found preferable to accomplish this by use of a fast moving or jet stream of water so as to force the water below the surface of the frothy mixture. The frothy mixture should be agitated during the reaction to insure adequate contact between the gaseous alcohol and water vapor. In this manner, the water becomes dispersed throughout the frothy mixture in the vapor state together with the vaporized alcohol contained therein and is in a ready state to react with the fatty acid modified alcoholate to cause hydrolysis thereof.

The amount of water or its equivalent in ice or steam should be sufficient to hydrolyze the fatty acid modified aluminum alcoholate to free the balance of the alcohol combined therewith. For example, when the amount of acid employed is about 1.2 mols of acid per mol of aluminum trialcoholate, the amount of water employed should be about 1.8 mols. Similarly, when the amount of acid employed is about 2.4 mols of acid per mol of aluminum trialcoholate, the amount of water employed should be about 0.6 mol. Small excesses of water may be employed to compensate for portions which are vaporized and lost from the mass, but, in general, excess water should not be employed other than to compensate for this vaporization since it has a peptizing effect on the gel and tends to produce inferior adhesives. Gelation occurs simultaneously with or shortly after the addition of the water depending upon how fast the water is dispersed throughout in the form of steam.

Ethylene glycol may be substituted for portions of the water and in particular may be substituted in amounts up to about 20% of the equivalent hydroxyl content thereof. It will be apparent in the case of ethylene glycol that 1 mol of the glycol is equivalent to 2 mols of water.

It will be apparent to those skilled in the art that the gel produced according to the method described herein may be further treated to form an adhesive coating composition having suitable elastic, viscosity and other properties suitable for the particular method of use. Thus, the gel may be modified by prolonged heating and/or through the use of suitable peptizing agents. In using such peptizing agents as ester gums, they are added to the gel after the formation thereof and preferably prior to the obtainment of the high viscosities associated with the viscous elastic forms thereof.

The following table sets forth formulations exemplifying ingredients utilized in the preparation of the gels and the conditioned adhesive compositions.

was then stirred into the molten wax and heat applied so as to raise the temperature of the mixture to about 248° F. in a period of about 10 minutes. About one-half of the stearic acid was added slowly and stirred into the mixture as the temperature rose above 198° F., and the balance was slowly added after the temperature reached 248° F. until the temperature fell to about 214° F. At this point the mixture was frothy and contained small bubbles of vaporized isopropyl alcohol dispersed throughout. After the stearic acid had been added, 1.33 grams of water was added with stirring to the frothy mixture by means of a syringe so as to force all of the water into the frothy mixture. Gelation occurred almost immediately and heat was applied to raise the temperature of the gel to about 265° F. in about 10 minutes. 49.8 grams of ester gum was added at about 220° F. with stirring while the heat was being applied to peptize the gel. The viscosity at 265° F. on a Brookfield viscometer at 6 R. P. M. with a No. 4 spindle was 26,000 cps. and the gel exhibited good qualities for use with roll coating apparatus for applying the adhesive to base materials.

Formulations Nos. 3 and 4 were prepared in a manner

Table

| Formulation No. | 1 | 2 | 3 | 4 | 5 | 6 | 7 | 8 |
|---|---|---|---|---|---|---|---|---|
| Microcrystalline Wax | 498.6 | 498.6 | 498.6 | 498.6 | 498.4 | 410 | 410 | 410 |
| Myristic Acid [1] | | | | | | | | |
| Stearic Acid [2] | 41.6 | 41.6 | 41.6 | 41.6 | 39.6 | | 36.6 | |
| Palmitic Acid [3] | | | | | | 37.0 | | |
| Behenic Acid [4] | | | | | 2.5 | | | 37.6 |
| Aluminum tri-isopropylate | | 15.1 | 15.1 | 15.1 | 15.1 | 14.5 | 16.3 | 11.8 |
| Aluminum tributoxide | 18.2 | | | | | | | |
| H$_2$O | 1.33 | 1.33 | 1.21 .077 | 1.06 .154 | 1.33 | 1.29 | 1.44 | 1.04 |
| Ethylene Glycol | | | 49.8 | 49.8 | | | | |
| Ester Gum | 60.8 | 49.8 | | | 49.8 | 50 | 50 | 50 |
| Viscosity [5] (cps.) of viscous elastic gel | | | | | 95,000 260° F. | | | |
| Viscosity [5] (cps.) of Conditioned gel | 12,500 264° F. | 26,000 265° F. | 22,000 265° F. | 15,500 265° F. | 45,000 260° F. | 38,000 260° F. | 33,000 257° F. | 28,000 255° F. |

[1] A commercial form having an apparent molecular weight of about 229.
[2] A commercial form of chemically pure stearic acid having an apparent molecular weight of about 282.
[3] A commercial form of chemically pure palmitic acid having an apparent molecular weight of about 260.
[4] A commercial form having an apparent molecular weight of about 325.
[5] Viscosities reported throughout were taken with a Brookfield viscometer using a No. 4 spindle at 6 R. P. M. unless otherwise indicated. The viscosity of formulations Nos. 6, 7, and 8 were taken with a Brookfield viscometer using a No. 6 spindle at 4 R. P. M. Temperatures at which taken are indicated in the table.

Formulation No. 1 (see table) was prepared by first melting 498.6 grams of microcrystalline wax in a beaker at a temperature of about 202° F. 18.2 grams of aluminum tri-sec. butoxide were then stirred into the molten wax and heat applied so as to raise the temperature of the mixture to about 265° F. in a period of about 10 minutes. About 25 grams of stearic acid were added to the mixture slowly with stirring during the temperature rise. Once the temperature had risen to 265° F., the heat was removed and the balance of the stearic acid was added slowly with agitation while the temperature fell to about 228° F. During the addition of the stearic acid, butyl alcohol was evolved and the mixture became frothy and contained small bubbles of vaporized butyl alcohol dispersed throughout. This frothiness continued to exist throughout the addition of the stearic acid. After the stearic acid had all been added, 1.33 grams of water was added with stirring to the frothy mixture by means of a syringe so as to force all of the water into the frothy mixture. Gelation occurred almost immediately and heat was applied to raise the temperature of the gel to about 265° F. in about 10 minutes. 60.8 grams of ester gum were added at about 230° F. with stirring while the heat was being applied to peptize the gel. The viscosity at 265° F. on a Brookfield viscometer at 6 R. P. M. with a No. 4 spindle was 12,500 cps. and the gel exhibited good qualities for use with roll coating apparatus for applying the adhesive to base materials.

Formulation No. 2 was prepared by first melting 498.6 grams of microcrystalline wax in a beaker at a temperature of 180° F., 15.1 grams of aluminum tri-isopropylate similar to Formulation No. 2 except that a portion of the water was substituted with ethylene glycol.

Formulation No. 5 was prepared in a manner similar to the method of preparing Formulation No. 1 except that the ester gum was not added until the temperature of the mixture reached 260° F. Prior to the addition of the ester gum the gel was very thixotropic and elastic and had a viscosity of about 95,000 cps. Once the ester gum was added, the mixture was heated to about 290° F. with constant stirring, and thereafter cooled to 260° F. whereat the viscosity was determined to be about 45,000 cps.

Formulation No. 6 was prepared by melting 410 grams of microcrystalline wax in a heated container. At a temperature of 226° F., 33.3 grams of a commercially pure form of palmitic acid were added to the melted wax with agitation and heating. Heating and agitation of the mass was continued and at 254° F., 14.5 grams of aluminum isopropylate was added with further agitation and application of heat until the temperature reached a maximum of about 267° F. After the latter temperature was reached, heating was discontinued. 16 minutes after the first addition of the fatty acid, 3.7 grams more of palmitic acid were added, the temperature having fallen to 257° F. at the time of this addition. Agitation was continued and the temperature dropped to 232° F. in about 13 minutes. The mixture at this point was frothy and contained dispersed bubbles of isopropyl alcohol throughout. At 232° F., 1.29 grams of water were injected into the frothy mixture by means of a syringe. 7 minutes later, good gelation had occurred, the temperature having fallen to 230° F. The mass was then heated to 240° F. At the latter temperature 50 grams of ester gum were added and heating and agitation continued until the viscosity of the mass had decreased appreciably and the temperature had reached 250° F. Thereafter the gel was aged for 1.5 hours in an oven at 260° F. and the viscosity then ascertained. The Brookfield viscosity at 4 R. P. M. using a No. 6 spindle was 38,000 cps. on the aged sample. The gel exhibited good adhesive properties.

Formulation No. 7 was prepared by first melting 410 grams of microcrystalline wax at about 280° F. With continuous stirring 32.9 grams of myristic acid were added to the molten wax. As soon as the acid was added the heat was reduced and the temperature fell to about 272° F. Thereafter, 16.3 grams of aluminum isopropylate were added, the batch being continuously mixed and stirred. About 15 minutes after the addition of aluminum isopropylate the temperature had dropped to about 247° F. and the mixture was frothy throughout and contained dispersed vapors of isopropyl alcohol. Thereafter, 3.7 additional grams of myristic acid were added to the frothy mixture and the mass continuously stirred for a period of about 15 minutes during which the temperature dropped to about 219° F. At this temperature 1.44 cc. of water was injected into the frothy mixture and heating resumed. At 244° F. about 8 minutes after the water was added, a gel formed. Heating and stirring were continued until the temperature of the mass reached about 256° F. and 50 grams of an ester gum were added and mixed therein. This caused the temperature to drop to about 238° F. during a period of about 3 minutes and thereafter the temperature gradually rose to about 257° F. because of the continued addition of heat. At this temperature the viscosity reading with a Brookfield viscometer using a No. 6 spindle at 4 R. P. M. was 33,000 cps. and the gel exhibited good adhesive properties for use with roll coating apparatus.

Formulation No. 8 was prepared by first melting 410 grams of microcrystalline wax at a temperature of 238° F. With continuous stirring 33.8 grams of behenic acid were added to the wax. Heating and agitation were continued and the temperature rose to about 250° F. in about 17 minutes. 11.8 grams of aluminum isopropylate were then added and heating discontinued shortly thereafter. After continuously stirring the mixture for about 15 minutes, the temperature had dropped to about 245° F. the mixture being frothy and containing dispersed isopropyl alcohol vapors throughout. 3.8 grams of additional behenic acid were then added with continuous stirring and after 15 minutes more the temperature had dropped to 227° F. At this temperature 1.04 grams of water were injected by syringe into the frothy mixture. Heat was then applied. A gel formed in about 8 minutes at a temperature of about 224° F. Thereafter with continued heating and stirring 50 grams of ester gum were added and the temperature permitted to rise to about 255° F. The viscosity at about 255° F. using a Brookfield viscometer with a No. 6 spindle at 4 R. P. M. was 28,000 cps. The gel exhibited excellent adhesive properties for use with roll coating apparatus.

I claim:

1. The method for preparing a gel suitable for use in the preparation of adhesive compositions comprising mixing a saturated higher fatty acid composed predominantly of a fatty acid selected from the group consisting of myristic acid, palmitic acid, stearic acid, arachidic acid, behenic acid and mixtures thereof, and an aluminum trialcoholate derived from an alcohol having from 2 to 5 carbon atoms with microcrystalline wax under substantially anhydrous conditions at a temperature ranging in excess of the boiling point of said alcohol to about 300° F. to form a frothy mixture of dispersed vaporized alcohol, microcrystalline wax and fatty acid modified aluminum alcoholate, said aluminum trialcoholate being mixed in amounts ranging from about 1% to about 15% by weight of said microcrystalline wax, and said saturated higher fatty acid and aluminum trialcoholate being mixed in proportions ranging from about 1.2 to about 2.4 mols of saturated higher fatty acid per mol of aluminum trialcoholate, thereafter hydrolyzing said fatty acid modified aluminum alcoholate in said frothy mixture by mixing a sufficient amount of water into said frothy mixture to free the balance of the alcohol combined with said fatty acid modified aluminum alcoholate while maintaining said frothy mixture at a temperature from in excess of 212° F. to about 290° F.

2. The method according to claim 1 wherein said aluminum tri-alcoholate is selected from the group consisting of aluminum tri-sec. butoxide and aluminum tri-isopropylate and wherein the amount of water added ranges from about 1.8 to about 0.6 mol of water per mol of aluminum tri-alcoholate.

3. The method according to claim 2 wherein ethylene glycol is substituted for a portion of the water in an amount up to about 20% of the hydroxyl equivalent thereof.

4. In a method for preparing an adhesive composition from a gel comprising an aluminum soap and microcrystalline wax, the improved method for preparing said gel comprising mixing a saturated higher fatty acid composed predominantly of a fatty acid selected from the group consisting of myristic acid, palmitic acid, stearic acid, arachidic acid, behenic acid and mixtures thereof, and an aluminum trialcoholate derived from an alcohol having from 2 to 5 carbon atoms with microcrystalline wax under substantially anhydrous conditions at a temperature ranging from about 200° F. to about 250° F. to form a frothy mixture of dispersed vaporous alcohol, microcrystalline wax and fatty acid modified aluminum alcoholate, said aluminum trialcoholate being mixed in amounts ranging from about 1% to about 15% by weight of said microcrystalline wax, and said saturated higher higher fatty acid and aluminum trialcoholate being mixed in proportions ranging from about 1.2 to about 2.4 mols of saturated higher fatty acid per mol of aluminum trialcoholate, thereafter hydrolyzing said fatty acid modified aluminum alcoholate in said frothy mixture by mixing from about 1.8 to about 0.6 mol of water per mol of aluminum trialcoholate into said frothy mixture to free the balance of the alcohol combined with said fatty acid modified aluminum alcoholate while maintaining said frothy mixture at a temperature from about 215° F. to about 265° F.

5. The method according to claim 4 wherein said aluminum trialcoholate is selected from the group consisting of aluminum tri-sec.-butoxide and aluminum tri-isopropylate and wherein ethylene glycol is subsituted for a portion of the water in an amount up to about 20% to the hydroxyl equivalent thereof.

6. In a method for preparing an adhesive composition from a gel comprising an aluminum soap and microcrystalline wax, the improved method for preparing said gel comprising mixing a saturated higher fatty acid composed predominantly of a fatty acid selected from the group consisting of myristic acid, palmitic acid, stearic acid and mixtures thereof and aluminum tri-isopropylate with microcrystalline wax under substantially anhydrous conditions at a temperature ranging in excess of the boiling point of isopropyl alcohol to about 300° F. to form a frothy mixture of dispersed vaporous isopropyl alcohol, microcrystalline wax and fatty acid modified aluminum isopropylate, said aluminum tri-isopropylate being mixed in amounts ranging from about 1% to about 15% by weight of said microcrystalline wax and said fatty acid and aluminum tri-isopropylate being mixed in proportions ranging from about 1.2 to about 2.4 mols of fatty acid per mol of aluminum tri-isopropylate, thereafter hydrolyzing said fatty acid modified aluminum isopropylate in said frothy mixture by mixing a sufficient amount of water into said frothy mixture to free the balance of the alcohol combined with said fatty acid modified aluminum isopropylate while maintaining said frothy mixture at a temperature from in excess of 212° F. to about 290° F.

7. A method according to claim 6 wherein said saturated higher fatty acid and aluminum tri-isopropylate are mixed with said microcrystalline wax at a temperature from about 200° F. to about 250° F., wherein said fatty acid and aluminum tri-isopropylate are mixed in proportions ranging from about 1.8 to about 2.2 mols of saturated higher fatty acid per mol of aluminum tri-isopropylate and wherein said frothy mixture is maintained at a temperature from about 215° F. to about 265° F.

8. A method according to claim 6 wherein the amount of water added to hydrolyze the fatty acid modified aluminum isopropylate ranges from about 1.8 mols to about 0.6 mol thereof per mol of aluminum tri-isopropylate.

9. A method according to claim 8 wherein ethylene glycol is substituted for a portion of the water in an amount up to about 20% of the hydroxyl equivalent thereof.

No references cited.